(12) United States Patent
Ichikawa et al.

(10) Patent No.: US 7,747,443 B2
(45) Date of Patent: Jun. 29, 2010

(54) APPARATUS, METHOD, AND PROGRAM FOR SUPPORTING SPEECH INTERFACE DESIGN

(75) Inventors: Osamu Ichikawa, Ebina (JP); Gakuto Kurata, Yamato (JP); Masafumi Nishimura, Yokohama (JP)

(73) Assignee: Nuance Communications, Inc., Burlington, MA (US)

( * ) Notice: Subject to any disclaimer, the term of this patent is extended or adjusted under 35 U.S.C. 154(b) by 286 days.

(21) Appl. No.: 11/773,256

(22) Filed: Jul. 3, 2007

(65) Prior Publication Data

US 2008/0040119 A1 Feb. 14, 2008

(30) Foreign Application Priority Data

Aug. 14, 2006 (JP) .............................. 2006-221322

(51) Int. Cl.
G10L 11/00 (2006.01)
G10L 15/26 (2006.01)
G06F 17/27 (2006.01)

(52) U.S. Cl. ............................ 704/270; 704/9; 704/235
(58) Field of Classification Search ........................ None
See application file for complete search history.

(56) References Cited

U.S. PATENT DOCUMENTS

| | | | |
|---|---|---|---|
| 7,219,056 B2 * | 5/2007 | Axelrod et al. ............... | 704/235 |
| 7,275,029 B1 * | 9/2007 | Gao et al. ....................... | 704/9 |
| 2005/0165598 A1 * | 7/2005 | Cote et al. ..................... | 704/1 |
| 2006/0206313 A1 * | 9/2006 | Xu et al. ....................... | 704/10 |

FOREIGN PATENT DOCUMENTS

| | | |
|---|---|---|
| JP | PUPA59-154500 | 9/1984 |
| JP | PUPA62-206595 | 9/1987 |
| JP | PUPA07-146699 | 6/1995 |
| JP | PUPA-11-119792 | 4/1999 |
| JP | PUPA-11-311522 | 11/1999 |

(Continued)

OTHER PUBLICATIONS

Kenji Kita, "Probabilistic Language Model," pp. 34-37, 60-62, Tokyo University Publishing, 1999.

(Continued)

*Primary Examiner*—David R Hudspeth
*Assistant Examiner*—Brian L Albertalli
(74) *Attorney, Agent, or Firm*—Wolf, Greenfield & Sacks, P.C.

(57) ABSTRACT

For design of a speech interface accepting speech control options, speech samples are stored on a computer-readable medium. A similarity calculating unit calculates a certain indication of similarity of first and second sets of ones of the speech samples, the first set of speech samples being associated with a first speech control option and the second set of speech samples being associated with a second speech control option. A display unit displays the similarity indication.

In another aspect, word vectors are generated for the respective speech sample sets, indicating frequencies of occurrence of respective words in the respective speech sample sets. The similarity calculating unit calculates the similarity indication responsive to the word vectors of the respective speech sample sets.

In another aspect, a perplexity indication is calculated for respective speech sample sets responsive to language models for the respective speech sample sets.

6 Claims, 6 Drawing Sheets

| SPEECH CONTROL OPTIONS | PERPLEXITY |
|---|---|
| PowerOn | 13.7366 |
| PowerOff | 10.4095 |
| Auto | 11.6803 |
| TempUp | 20.0935 |
| TempDown | 21.2758 |
| TempValue | 9.2044 |
| Floor | 23.0375 |
| Dash | 24.1699 |
| FloorWindow | 36.1695 |
| DashFloor | 30.1567 |
| FanSpeedUp | 14.3684 |
| FanSpeedDown | 15.1417 |

FOREIGN PATENT DOCUMENTS

| | | |
|---|---|---|
| JP | PUPA-11-334483 | 12/1999 |
| JP | PUPA-2000-267694 | 9/2000 |
| JP | PUPA-2001-63489 | 3/2001 |
| JP | PUPA2001-250101 A | 9/2001 |
| JP | PUPA-2001-312297 | 11/2001 |
| JP | PUPA2005-234236 A | 9/2005 |

OTHER PUBLICATIONS

Stephen C. North, "Drawing graphs with NEATO," URL: http://www.graphviz.org/Documentation/neatoguide.pdf, Aug. 26, 2004.

* cited by examiner

FIG. 5

| SPEECH CONTROL OPTIONS | PERPLEXITY |
|---|---|
| PowerOn | 13.7366 |
| PowerOff | 10.4095 |
| Auto | 11.6803 |
| TempUp | 20.0935 |
| TempDown | 21.2758 |
| TempValue | 9.2044 |
| Floor | 23.0375 |
| Dash | 24.1699 |
| FloorWindow | 36.1695 |
| DashFloor | 30.1567 |
| FanSpeedUp | 14.3684 |
| FanSpeedDown | 15.1417 |

FIG. 6

| COMBINATIONS OF SPEECH CONTROL OPTIONS (AIR DIRECTION CONTROL ONLY) | SIMILARITY |
|---|---|
| Dash---DashFloor | 0.850016057 |
| Dash---Floor | 0.7496271 |
| Dash---FloorWindow | 0.633089326 |
| DashFloor---Floor | 0.862926196 |
| DashFloor---FloorWindow | 0.879886095 |
| FloorWindow---Floor | 0.843835538 |

APPARATUS, METHOD, AND PROGRAM FOR SUPPORTING SPEECH INTERFACE DESIGN

TECHNICAL FIELD

The present invention generally relates to speech recognition technology and specifically to a system, method, and program for designing speech interfaces.

BACKGROUND ART

System control carried out through a speech interface based on speech recognition technology is widespread. For example, recently, to allow hands-free operation while driving, in-car systems, such as navigation systems, in-car air conditioners, and in-car audio systems often provide a speech interface. To realize system control through a better speech interface, various types of speech recognition technology have been studied in many areas.

Japanese Unexamined Patent Application Publication No. 2001-312297 discloses a speech recognition apparatus that includes a control unit and a speech synthesis unit. The control unit gives instructions to a controller for equipment on the basis of a recognized speech command. On the basis of the instructions from the control unit, the speech synthesis unit outputs, from a speech output unit, various kinds of information through speech. When a special command is recognized, the speech recognition apparatus performs conversational guidance processing for explaining how to operate the equipment.

Japanese Unexamined Patent Application Publication No. 2000-267694 discloses a speech recognition apparatus having a speech command group with a hierarchical structure. Each layer of the hierarchical structure of the speech command group includes final speech commands giving final instructions for operation of equipment, and intermediate speech commands giving intermediate instructions and requiring selection of a final speech command at a lower layer for operation of the equipment. Each layer of the hierarchical structure of the speech command group also includes a speech command for canceling an input speech command or a speech command for terminating speech recognition.

Japanese Unexamined Patent Application Publication No. 2001-63489 discloses a centralized management system for in-car equipment. When a return instruction for canceling an operation instruction is given, the centralized management system checks whether a screen has been changed according to the canceled operation instruction. If the screen has been changed, the centralized management system obtains the latest operation instruction according to which the screen was previously changed, gives an instruction to display a screen, refers to a screen transition history, and displays a screen displayed immediately before the execution of the canceled operation instruction.

Japanese Unexamined Patent Application Publication No. 11-311522 discloses an operation apparatus for in-car equipment. If a right-hand direction is selected when selection areas are displayed on the top, bottom, and left and a combined area is displayed on the right, the operation apparatus generates three separate areas corresponding to functions "Others", "VICS", and "FM Multiplex", allows these three separate areas to be displayed close to each other, and moves the selection areas by a certain distance.

Japanese Unexamined Patent Application Publication No. 11-334483 discloses an in-car equipment control system that includes a front control unit for front seat passengers and a rear control unit for rear seat passengers. The front control unit has functions necessary for driving, and the rear control unit has functions for entertainment purposes. In other words, the in-car equipment control system provides these different control units for the distribution of functions.

Japanese Unexamined Patent Application Publication No. 11-119792 discloses an equipment control apparatus having a speech recognition function and capable of preferably responding to the input of similar type commands. When a similar type command is recognized, the equipment control apparatus determines whether to permit or prohibit the execution of the similar type command on the basis of the current driving conditions. For prohibiting the execution of the similar type command, the equipment control apparatus gives a talk-back to prompt the user to speak again using a paraphrastic command. For permitting the execution of the similar type command, the equipment control apparatus gives a talk-back to prompt the user to use a paraphrastic command from the next time.

Japanese Unexamined Patent Application Publication No. 2001-312297

Japanese Unexamined Patent Application Publication No. 2000-267694

Japanese Unexamined Patent Application Publication No. 2001-63489

Japanese Unexamined Patent Application Publication No. 11-311522

Japanese Unexamined Patent Application Publication No. 11-334483

Japanese Unexamined Patent Application Publication No. 11-119792

Kita, Kenji. Probabilistic Language Model. University of Tokyo Press, 25 Nov. 1999. 34-37, 60-62.

North, Stephen C. "Drawing graphs with NEATO." Online. 26 Apr. 2004. 8 Aug. 2006 <http://www.graphviz.org/Documentation/neatoguide.pdf>.

PROBLEMS TO BE SOLVED BY THE INVENTION

As speech interfaces for a variety of systems are becoming widespread, demands for more convenient speech interfaces are increasing. For example, there are increasing demands for technology in which system control is achieved by performing speech recognition on words freely spoken by a user and identifying the intension of the user.

However, if more freedom is given to speech input for each speech control option, it may be difficult to perform successful speech recognition on the speech input and understand the user's intention. Also, since systems with speech user interfaces often provide a plurality of speech control options, it may be difficult to determine which of the plurality of speech control options corresponds to words spoken by the system user.

Therefore, it is necessary to design a speech interface that can overcome these difficulties. However, speech interface design operations are currently performed through a trial and error process on the basis of long years of experience. This requires sophisticated design engineers to spend considerable time.

An object of the present invention is to provide an apparatus, program, and method for supporting the design of speech interfaces which accept a plurality of speech control options.

Another object of the present invention is to provide an apparatus, program, and method for indicating the degrees of similarity among speech sample sets associated with different attributes.

SUMMARY

The foregoing need is addressed in the present invention. According to one form of the invention, a speech interface design apparatus accepts a plurality of speech control options including speech samples stored on a computer-readable medium. A similarity calculating unit calculates a certain indication of similarity of first and second sets of speech samples. The first set of speech samples is associated with a first speech control option, and the second set of speech samples is associated with a second speech control option. A display unit displays the similarity indication.

In another aspect, the speech interface design apparatus includes a word vector generating unit configured to generate first and second word vectors for the respective first and second speech sample sets. The word vector for a given speech sample set indicates frequencies of occurrence of respective words in the given speech sample set. The similarity calculating unit calculates the similarity indication responsive to the word vectors of the respective first and second speech sample sets.

In another aspect, the similarity calculating unit calculates the similarity indication responsive to an angle between the word vectors of the first and second speech sample sets.

In another aspect, the speech interface design apparatus includes a generating unit configured to generate a language model for the first speech sample set responsive to certain speech samples of the first speech sample set. A perplexity calculating unit is configured to calculate a perplexity indication for the first speech sample set responsive to the language model for the first speech sample set.

In another aspect, the perplexity calculating unit calculates the perplexity responsive to particular speech samples of the first speech sample set, wherein the particular speech samples do not include the certain speech samples used by the generating unit in generating the language model for the first speech sample set.

In another aspect, the display unit displays a graph having points and circles around the respective points, wherein the points of the graph correspond to respective speech control options and the circles around the respective points have respective radii, the radii corresponding to amounts of perplexity for the speech control options of the respective points.

In another aspect, the speech interface design apparatus includes a generating unit configured to generate a language model for the first speech sample set responsive to certain speech samples of the first speech sample set. The perplexity calculating unit is configured to calculate a perplexity indication for the first speech sample set responsive to the language model for the first speech sample set. The display unit displays a graph having points and circles around the respective points. The points of the graph correspond to respective speech control options and the circles around the respective points have respective radii, the radii corresponding to amounts of perplexity for the speech control options of the respective points.

According to another form of the invention, a computer program product concerns speech interface design. The computer program product has instructions stored on a tangible, computer-readable medium for execution by the computer to perform steps such as described above.

According to another form of the invention, a computer system includes a processor and a storage device connected to the processor. The storage device has stored thereon program instructions for controlling the processor to perform steps such as described above.

Other variations, objects, advantages, and forms of the invention will become apparent upon reading the following detailed description and upon reference to the accompanying drawings.

BRIEF DESCRIPTION OF THE DRAWINGS

FIG. 5 shows exemplary perplexity values for a plurality of speech control options according to the embodiment.

FIG. 6 shows exemplary similarity values according to the embodiment.

MEANS FOR SOLVING THE PROBLEMS

Figure 1:
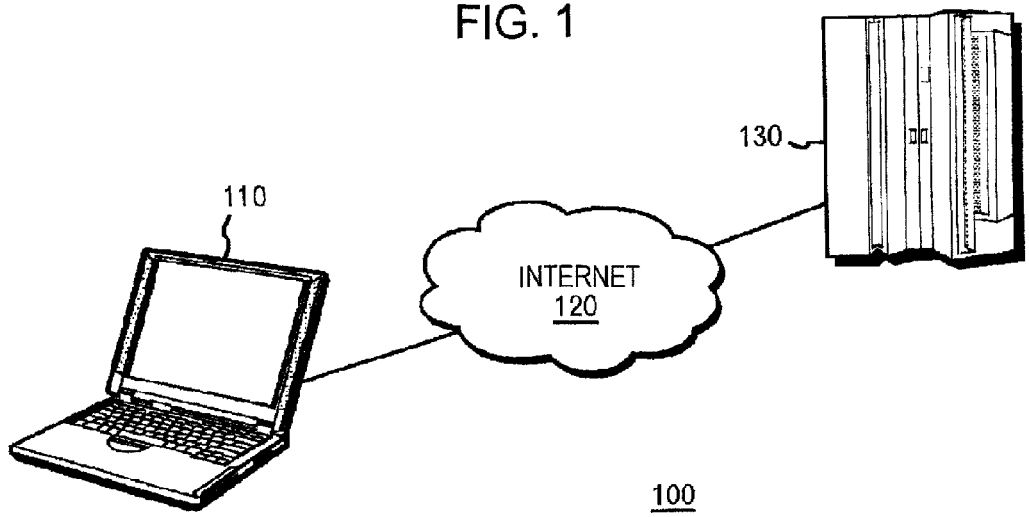
FIG. 1 is an exemplary overview of a network system according to an embodiment of the present invention.

To achieve the objects described above, there is provided an apparatus for supporting the design of speech interfaces that accept a plurality of speech control options. The apparatus includes a database in which speech samples each of which is associated with one of the plurality of speech control options are recorded, a similarity calculating unit configured to calculate the degree of similarity between a first set of speech samples associated with a first speech control option and a second set of speech samples associated with a second speech control option, and a display unit configured to display the degree of similarity between the first set and the second set. It is preferable that the display unit display a graph on which points corresponding to the respective plurality of speech control options are plotted to show the degree of similarity.

Also, there is provided an apparatus including a database in which speech samples each of which is associated with one of a plurality of predetermined attributes are recorded, a similarity calculating unit configured to calculate the degree of similarity between a first set of speech samples associated with a first attribute and a second set of speech samples associated with a second attribute, and a display unit configured to display the degree of similarity between the first set and the second set.

While the present invention has been briefly described as an apparatus for supporting the design of speech interfaces that accept a plurality of speech control options, the present invention may also be viewed as a program, program product, or method. The program product may include, for example, a storage medium in which the program is stored or a medium for transmitting the program.

There is also provided a method for supporting the design of a speech interface for a system of a client. The method is implemented in a computer accessible to a database in which speech samples each of which is associated with one of a plurality of speech control options for the system being designed by the client are recorded. The method includes the steps of calculating the degree of similarity between a first set of speech samples associated with a first speech control option and a second set of speech samples associated with a second speech control option; displaying the degree of similarity between the first set and the second set; and generating, in response to an input of an analysis of the displayed degree of similarity, an electronic report on the analysis.

It should be noted that the foregoing summary of the present invention does not cover all features necessary for the present invention. At the same time, it should be noted that combinations or sub-combinations of the above-described components can also constitute the present invention.

BEST MODE FOR CARRYING OUT THE INVENTION

The best mode for carrying out the present invention will now be described in detail with reference to the drawings. The following embodiments are not intended to limit the scope of the claims of the present invention. At the same time, not all combinations of features described in the embodiments are essential to the solving means of the present invention.

The present invention can be implemented in many different modes and should not be considered as being limited to the embodiments described herein. Throughout the description of the embodiments, the same elements are given the same reference numerals.

An embodiment of the present invention will be described using a scenario where a product design engineer for a company engaged in production and distribution of systems (or more specifically, in-car air conditioners) with speech interfaces receives specialized advice, from a technology consultant with very specialized knowledge of speech interface design, on a speech interface for an in-car air conditioner under development. Hereinafter, the product design engineer and technology consultant described above are referred to as "client" and "consultant", respectively.

FIG. 1 is a high-level diagram of a network system 100 for designing the in-car air conditioner according to the present embodiment.

The network system 100 includes a designing apparatus 130 operated by the client designing the in-car air conditioner and a supporting apparatus 110 operated by the consultant and used to support the design of the speech interface being developed by the client.

In the present embodiment, the designing apparatus 130 and the supporting apparatus 110 can communicate with each other via a network 120. For example, the network 120 can be implemented as the Internet. The Internet uses the transmission control protocol/Internet protocol (TCP/IP) to enable connections among computers.

Figure 2:
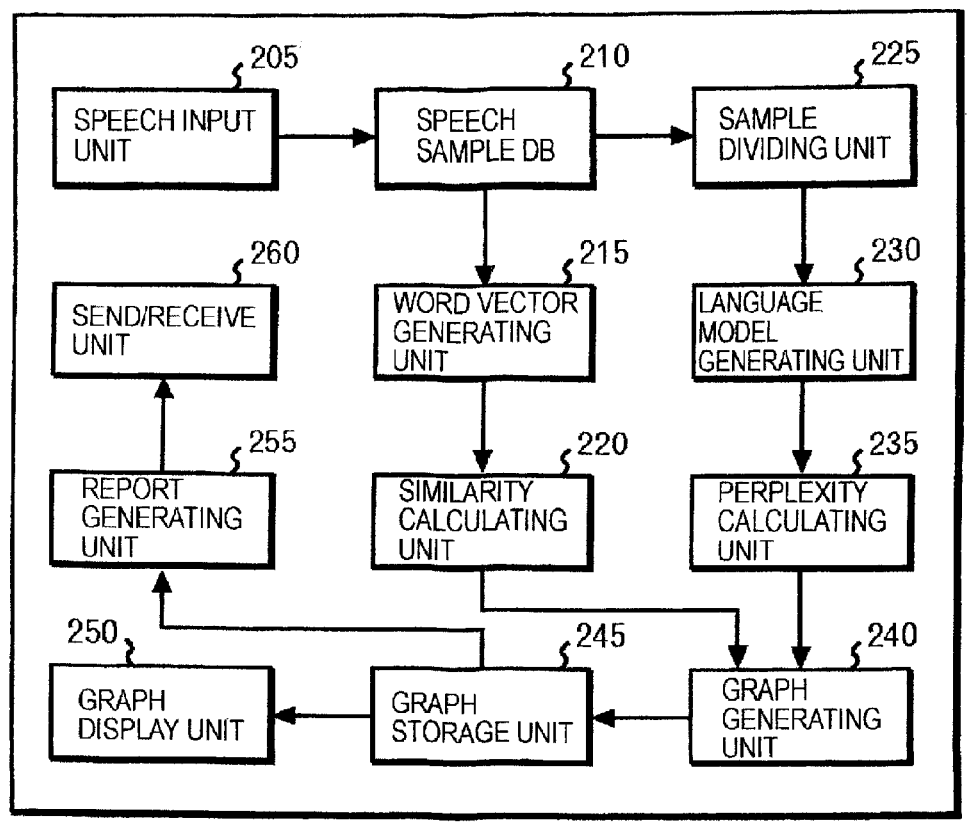
FIG. 2 is a functional block diagram illustrating a supporting apparatus of the embodiment.

FIG. 2 is a functional block diagram illustrating the supporting apparatus 110 of the present embodiment. Components illustrated in the functional block diagram of FIG. 2 can be implemented, in an information processing apparatus with a hardware configuration illustrated in FIG. 8, by loading in main memory 4 a computer program (e.g., operating system or speech recognition application) stored in a hard disk device 13 or the like, having a central processing unit (CPU) 1 read the computer program, and allowing hardware resources and software to operate in cooperation.

The supporting apparatus 110 includes a speech input unit 205 and a speech sample database 210. The speech input unit 205 has a function of converting analog speech collected through a microphone into a speech sample. In the present embodiment, a speech sample is text data produced by converting analog speech using speech recognition technology. Also, the speech input unit 205 has a function of storing, in the speech sample database 210, a speech sample to be associated with one of a plurality of predetermined attributes, or more specifically, a plurality of speech control options for the in-car air conditioner being designed by the client. Therefore, in the speech sample database 210 of the present embodiment, a speech sample associated with one of the plurality of speech control options is stored.

The supporting apparatus 110 further includes a word vector generating unit 215 and a similarity calculating unit 220. The word vector generating unit 215 is capable of generating, for each of the plurality of speech control options, a word vector on the basis of the frequency of occurrence of each word in a set of speech samples (hereinafter referred to as "speech sample set") associated with the speech control option. The generation of a word vector will be described in detail later.

On the basis of word vectors generated by the word vector generating unit 215, or more specifically, by calculating the cosine of the angle between word vectors for any two speech control options, the similarity calculating unit 220 can calculate the degree of similarity between speech sample sets corresponding to the two speech control options.

The supporting apparatus 110 further includes a sample dividing unit 225, a language model generating unit 230, and a perplexity calculating unit 235. To determine learning data for generating a language model and test data for calculating perplexity, the sample dividing unit 225 divides a speech sample set corresponding to each speech control option in a predetermined ratio. To generate a language model and calculate perplexity in the present embodiment, cross validation is performed where the ratio between learning data and test data is 9:1. The sample dividing unit 225 divides speech samples included in a speech sample set for each speech control option into ten groups.

The language model generating unit 230 generates a language model from speech samples used as learning data. The perplexity calculating unit 235 uses the language model generated by the language model generating unit 230 to calculate perplexity from speech samples used as test data. Perplexity is an index indicating the degree of linguistic difficulty of speech recognition.

More specifically, perplexity indicates an average word branching factor in an information theoretical sense. A higher perplexity value (i.e., greater average word branching factor) means a higher degree of difficulty in identifying a word and linguistic complexity of the word. Therefore, a higher perplexity value means a higher degree of difficulty of speech recognition to be performed on the word. The language model generation and the perplexity calculation performed by the language model generating unit 230 and the perplexity calculating unit 235, respectively, will be described in detail later.

The supporting apparatus 110 further includes a graph generating unit 240, a graph storage unit 245, and a graph display unit 250. The graph generating unit 240 has a function of generating a graph showing the degrees of similarity and perplexity calculated for the plurality of speech control options for the in-car air conditioner by the similarity calculating unit 220 and perplexity calculating unit 235. The generation of such a graph will be described in detail later.

The graph storage unit 245 has a function of storing data for a graph generated by the graph generating unit 240. The graph display unit 250 displays graph data stored in the graph storage unit 245, thereby providing the consultant who operates the supporting apparatus 110 with information useful in designing a speech interface.

The supporting apparatus 110 further includes a report generating unit 255 and a send/receive unit 260. The report generating unit 255 has a function of electronically generating an analysis report according to input from the consultant who has performed analysis on the speech input interface by referring to the graph displayed in the display unit 250. In the present embodiment, the report generating unit 255 can access the graph data stored in the graph storage unit 245 to include the graph in the electronic report. The send/receive unit 260 has a function of sending the generated electronic report via the network 120 to the designing apparatus 130 operated by the client.

Figure 3:
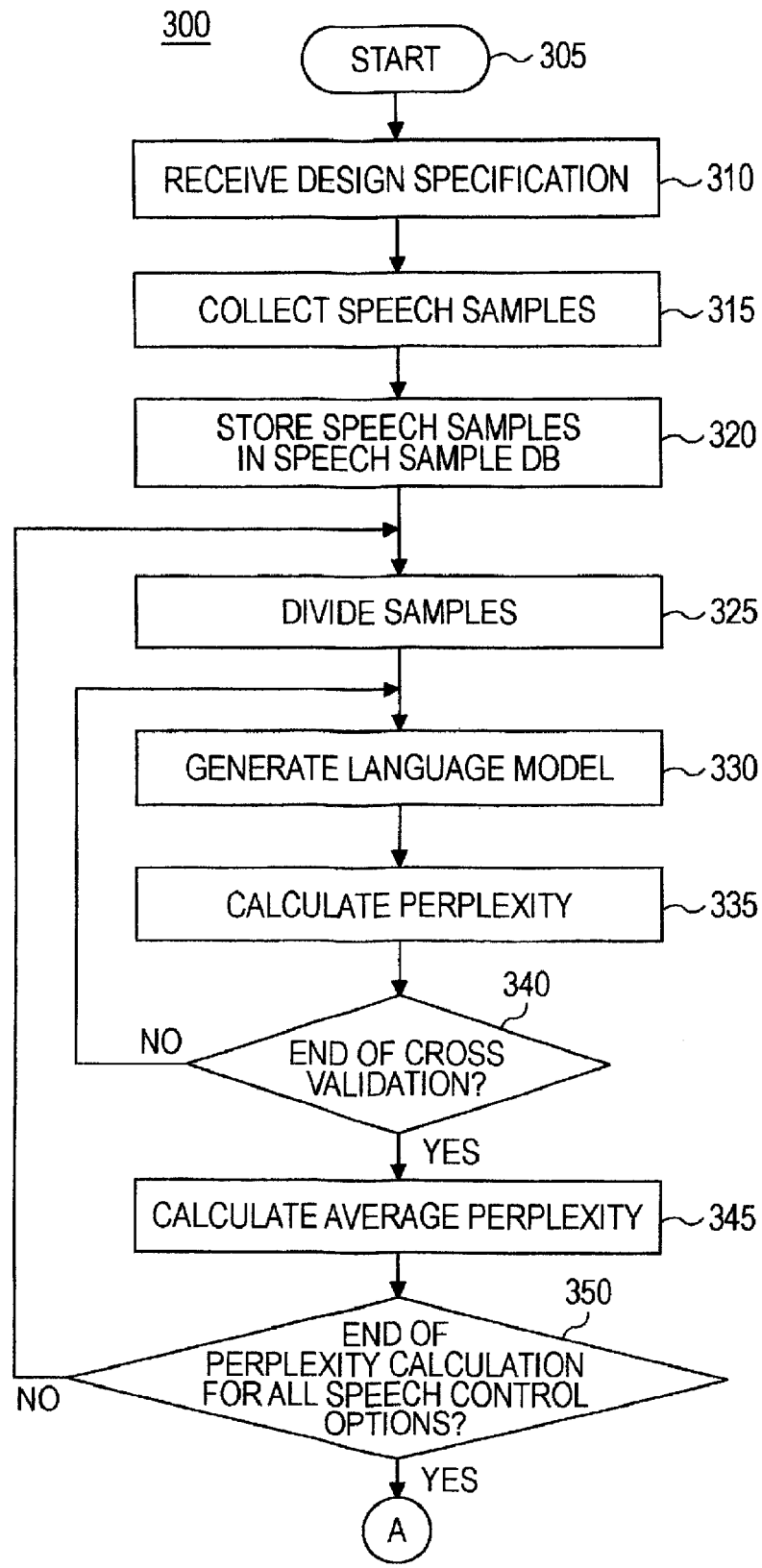
FIG. 3 is a flowchart illustrating the operation of the network system according to the embodiment.
Figure 4:
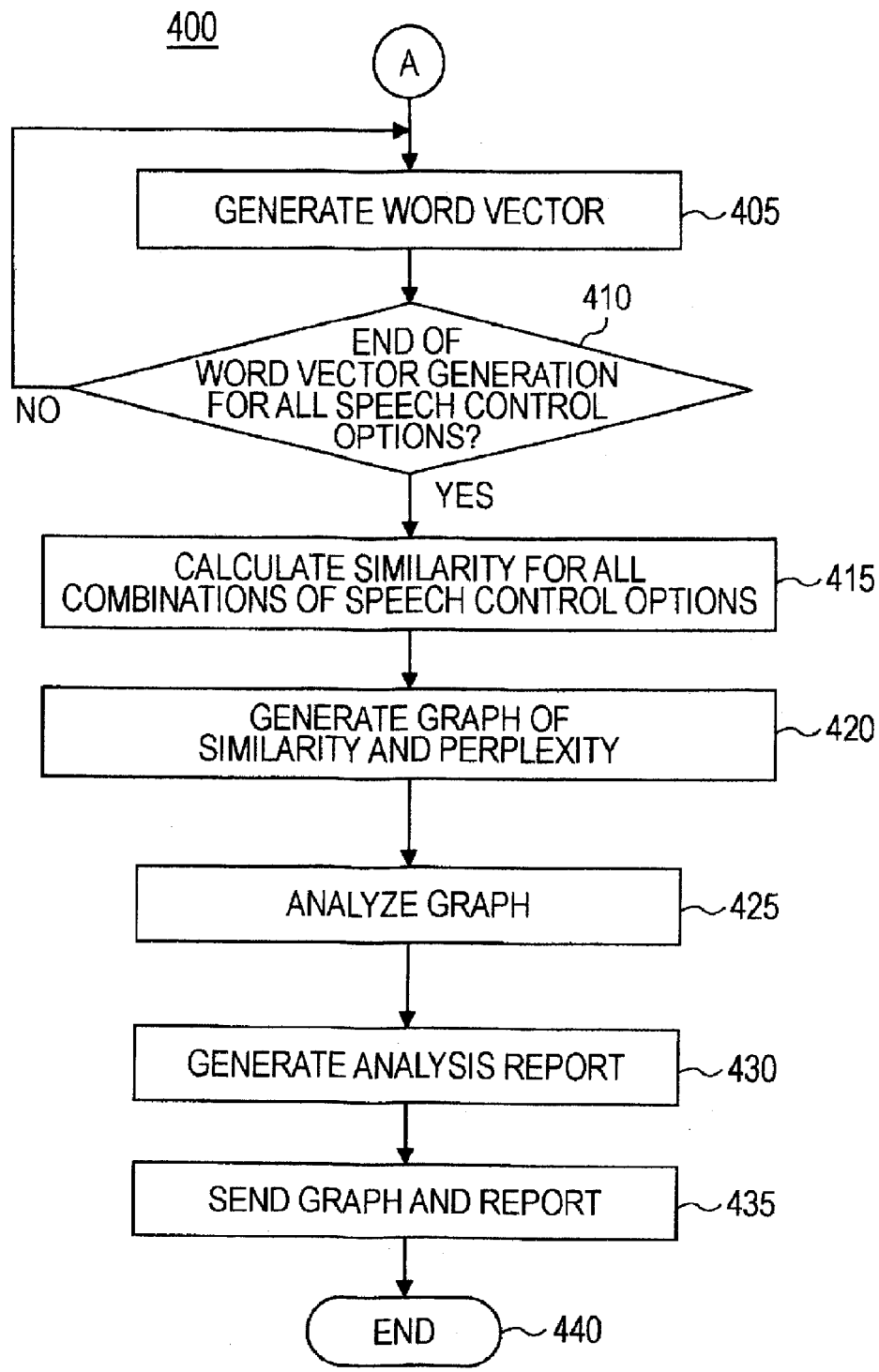
FIG. 4 is a flowchart illustrating the operation of the network system according to the embodiment.

FIGS. 3 and 4 are flowcharts 300 and 400 illustrating the operation of the network system 100 according to the present embodiment. The process starts in step S305 of FIG. 3. In step S310, the consultant receives a specification of the speech interface and the like for the in-car air conditioner being designed by the client. In the present embodiment, the specification received by the consultant defines the speech interface of the in-car air conditioner such that the speech interface can accept speech input for 12 speech control options as follows.

1. PowerOn: Turn on the power
2. PowerOff: Turn off the power
3. Auto: Select auto air conditioning mode
4. TempUp: Raise the room temperature
5. TempDown: Lower the room temperature
6. TempValue: Set the room temperature
7. Floor: Direct air flow to the floor
8. Dash: Direct air flow upward
9. FloorWindow: Direct air flow to the floor and window
10. DashFloor: Direct air flow to the floor and upward
11. FanSpeedUp: Increase the air volume
12. FanSpeedDown: Decrease the air volume Next, in step S315, the consultant performs a service of collecting many speech samples for each of the plurality of speech control options in accordance with the specification received in step S310. Specifically, for example, the consultant asks for cooperation from many people and asks them to speak freely to select each of the 12 speech control options. Then, the consultant has the speech input unit 205 of the supporting apparatus 110 perform speech recognition on the spoken words, thereby achieving the service described above. In the present embodiment, the consultant may use a keyboard of the supporting apparatus 110 to directly enter text or may translate the heard analog speech into text, thereby generating speech samples, that is, text data. As a result of performing this service, many speech samples for each of the speech control options can be collected.

The process proceeds to step S320, where the consultant stores, in the speech sample database 210, the many speech samples collected in step S315 to be associated with their corresponding speech control options.

The process proceeds to step S325, where the sample dividing unit 225 divides, for each of the speech control options, a set of many speech samples stored in the speech sample database 210 in a predetermined ratio. As described above, to calculate perplexity in the present embodiment, cross validation is performed where the ratio between learning data and test data is 9:1. Therefore, in step S325, the sample dividing unit 225 divides speech samples included in a speech sample set for each speech control option into ten groups.

The process proceeds to step S330, where the language model generating unit 230 uses nine out of the ten groups of speech samples obtained in step S325 as learning data and generates a language model from speech samples included in the learning data.

A language model in the present embodiment is a well-known word N-gram model. The word N-gram model can be calculated by determining occurrence probability P using Numerical Expression 1, where n represents the number of types of words included in learning data, $w_1^n$ represents word strings $w_1$ through $w_n$ in the learning data, and $C(w_1^n)$ represents the number of times word string $w_1^n$ occurs in the learning data.

$$P(w_n \mid w_{n-N+1}^{n-1}) = \frac{C(w_{n-N+1}^n)}{C(w_{n-N+1}^{n-1})}$$

Here, the word N-gram model is referred to as "unigram" when N=1, "bigram" when N=2, and "trigram" when N=3. While any of language models, including "bigram" and "trigram", can be used to implement the present invention, "unigram" is used in the present embodiment. It should be noted in the present embodiment that an occurrence probability value is calculated as a logarithm of P (log P) in Numerical Expression 1.

The process further proceeds to step S335, where the perplexity calculating unit 235 uses the language model generated by the language model generating unit 230 in step S330 to calculate perplexity from speech samples included in test data, the speech samples having not been used as learning data in step S330.

More specifically, in the present embodiment, this perplexity is calculated using Numerical Expression 2, where L represents test data, n represents the number of types of words included in test data L, $w_1^n$ represents word strings $w_1$ through $w_n$ in test data L, and PP represents perplexity.

$$H(L) = -\sum_{w_1^n} \frac{1}{n} P(w_1^n) \log P(w_1^n)$$

$$PP = 2^{H(L)}$$

The process proceeds to step S340, where it is determined whether the cross validation for the speech samples divided in step S325 has been completed. If it is determined in step S340 that the cross validation has not been completed (i.e., "NO" in step S340), the process returns to step S330. Then, steps S330 and S335 are repeated until the cross validation is completed.

On the other hand, if it is determined in step S340 that the cross validation has been completed (i.e., "YES" in step S340), the process proceeds to step S345, where the average of perplexity values obtained by repeating calculation in step S335 is calculated. Then, the calculated average value is used as perplexity of the speech control option. After the perplexity of the speech control option is calculated in step S345, the process proceeds to step S350.

In step S350, it is determined whether perplexity calculation for all the plurality of speech control options has been completed. If it is determined in step S350 that perplexity calculation for all the plurality of speech control options has not yet been completed (i.e., "NO" in step S350), the process returns to step S325. Then, steps S325 through S345 are repeated until perplexity calculation for all the plurality of speech control options is completed.

On the other hand, if it is determined in step S350 that perplexity calculation for all the plurality of speech control options has been completed (i.e., "YES" in step S350), the perplexity calculation ends here. Then, the process proceeds via "A" to step S405 in the flowchart 400 of FIG. 4. FIG. 5 shows exemplary perplexity values for the 12 speech control options of the in-car air conditioner according to the present embodiment.

Referring back to step S405 of FIG. 4, the word vector generating unit 215 calculates, on the basis of the frequency of occurrence of each word in a speech sample set associated with a speech control option, a word vector of the speech sample set, the word vector being normalized by assigning a value of 1 to the length thereof. More specifically, such a word vector can be generated by calculating word vector element $v_i$ corresponding to every word $w_i$ included in a speech sample set using Numerical Expression 3, where n represents the number of types of words included in the speech sample set and $C(w_i)$ represents the frequency of occurrence of word $w_i$. For example, in Numerical Expression 3, each word can be weighed according to its importance. It should be noted that such variations can be made as appropriate by those skilled in the art.

$$v_i = \frac{C(w_i)}{\sum_{k=1}^{n} C(w_k)}$$

After a word vector is generated in step S405, the process proceeds to step S410, where it is determined whether word vector generation for all the plurality of speech control options has been completed. If it is determined in step S410 that the word vector generation has not yet been completed (i.e., "NO" in step S410), the process returns to step S405. Then, the processing in step S405 is repeated until the completion of word vector generation for all the plurality of speech control options.

On the other hand, if it is determined in step S410 that the word vector generation has been completed (i.e., "YES" in step S410), the process proceeds to step S415.

In step S415, the similarity calculating unit 220 selects a combination of two speech control options from the plurality of speech control options and calculates, for all combinations of two speech control options, the degree of similarity between speech sample sets associated with the respective two speech control options. The degree of similarity can be determined by calculating the cosine of the angle between word vectors corresponding to two speech control options of the combination.

FIG. 6 shows exemplary similarity values generated, by the similarity calculating unit 220, for speech control options related to air directions ("Floor", "Dash", "FloorWindow", and "DashFloor") among the 12 speech control options for the in-car air conditioner according to the present embodiment. It should be noted that, for simplicity of explanation, FIG. 6 shows combinations of two speech control options selected from four speech control options related to air directions only, as all combinations of two speech control options selected from the 12 speech control options are too many to be shown.

Referring back to FIG. 4, the process proceeds to step S420, where the graph generating unit 240 generates a graph showing the perplexity of speech control options calculated in steps S325 through S345 and the degrees of similarity calculated in step S415. In step S420, the graph storage unit 245 stores graph data generated by the graph generating unit 240. Also in step S420, the graph display unit 250 displays the graph on the basis of the graph data.

Figure 7:
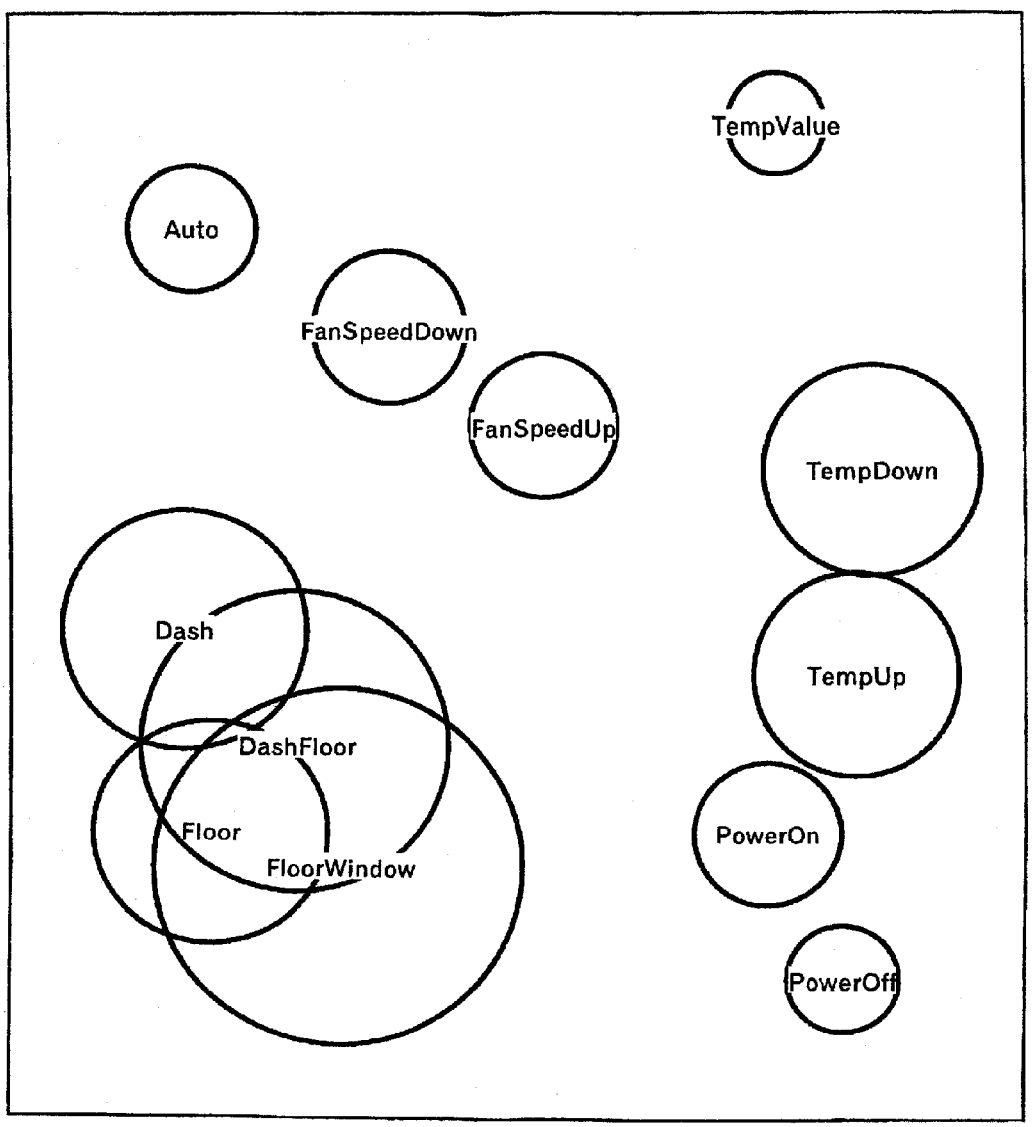
FIG. 7 illustrates an image of an exemplary graph according to the embodiment.

More specifically, in the present embodiment, the graph generating unit 240 uses the degree of similarity between a speech sample set corresponding to one speech control option and another speech sample set corresponding to another speech control option as a spring constant so as to plot, using a well-known spring model, points corresponding to the respective plurality of speech control options on a two-dimensional plane. Then, the graph generating unit 240 draws a circle around each plotted point with a radius corresponding to perplexity, thereby generating a graph. FIG. 7 is an exemplary graph generated by the graph generating unit 240 for the 12 speech control options of the in-car air conditioner according to the present embodiment.

Referring back to FIG. 4, in step S425, the consultant analyzes the graph displayed in step S420. For example, if it is observed from the graph that the radius of a circle around a point corresponding to a certain speech control option is large, variations in speech corresponding to this speech control option will be large. From the observation of this graph, the consultant can conclude that it is difficult to achieve accurate speech recognition for this speech control option or it is very likely that large calculation resources will be consumed. In this case, the consultant can suggest, for example, (1) collecting additional speech samples related to this speech control option for more accurate word prediction or (2) presenting words or numbers to be spoken on the in-car air conditioner so as to reduce variations in speech corresponding to this speech control option.

There are also possible analyses to be performed in step S425. For example, if some circles representing a plurality of speech control options overlap one another considerably, speech tendencies corresponding to the respective speech control options are similar to one another. Therefore, it will be difficult to select a specific speech control option by speech, and thus, control operation intended by the user may not be performed. In this case, the consultant can suggest adding an appropriate speech control option, such as dialog or the like, to these speech control options for accurate extraction of the user's intention. Also, for example, it is possible to consider whether the above-described overlaps can be reduced by removing some less frequently used speech control options from the subjects of speech recognition.

On the basis of the analysis described above, the consultant who has observed the graph of FIG. 7 can take, for example, the following actions. That is, according to the graph of FIG. 7, circles corresponding to the respective four speech control options related to air directions ("Floor", "Dash", "FloorWindow", and "DashFloor") are large in radius and overlap one another considerably. Therefore, the consultant can assume that users in various ways express each of these speech control options, and at the same time, speech tendencies corresponding to the respective speech control options are similar to one another. Thus, the consultant can give the client advice and suggestions (1) through (5) below.

(1) It is difficult for users to properly and distinctly express the current four speech control options related to air directions by speech. It is thus desirable that the speech control options related to air directions be redefined.

(2) It is predicted that users will express each of the four speech control options in a variety of ways by speech. It is thus necessary to collect additional speech samples to ensure the accuracy of speech recognition.

(3) Removing some of the four speech control options related to air directions can highlight the remaining speech control options. For example, removing "FloorWindow" and "DashFloor" can highlight "Floor" and "Dash".

(4) Better speech control can be achieved if the four speech control options related to air directions are grouped into one option, such as "Air Direction Control".

(5) It is advisable, after "Air Direction Control" mode is entered, that an air direction to be selected is determined through dialog.

The process proceeds to step S430, where the report generating unit 255 generates an electronic analysis report on the basis of an input from the consultant who performed analysis in step S425. In step S430, it is preferable that the report generating unit 255 includes, in the electronic report, the graph data stored in the graph storage unit 245. The process proceeds to step S435, where the send/receive unit 260 sends the electronic report generated in step S430 via the network 120 to the designing apparatus 130 of the client. Then, the process proceeds to step S440 and ends.

According to the present embodiment described above, it is possible to provide an apparatus, software, and method for realizing the design of a system (e.g., in-car air conditioner) that provides a speech interface with a plurality of speech control options. Therefore, it can be easily understood that it is possible to improve design quality and productivity of design engineers operating a designing apparatus for designing a system with a speech interface.

Figure 8:
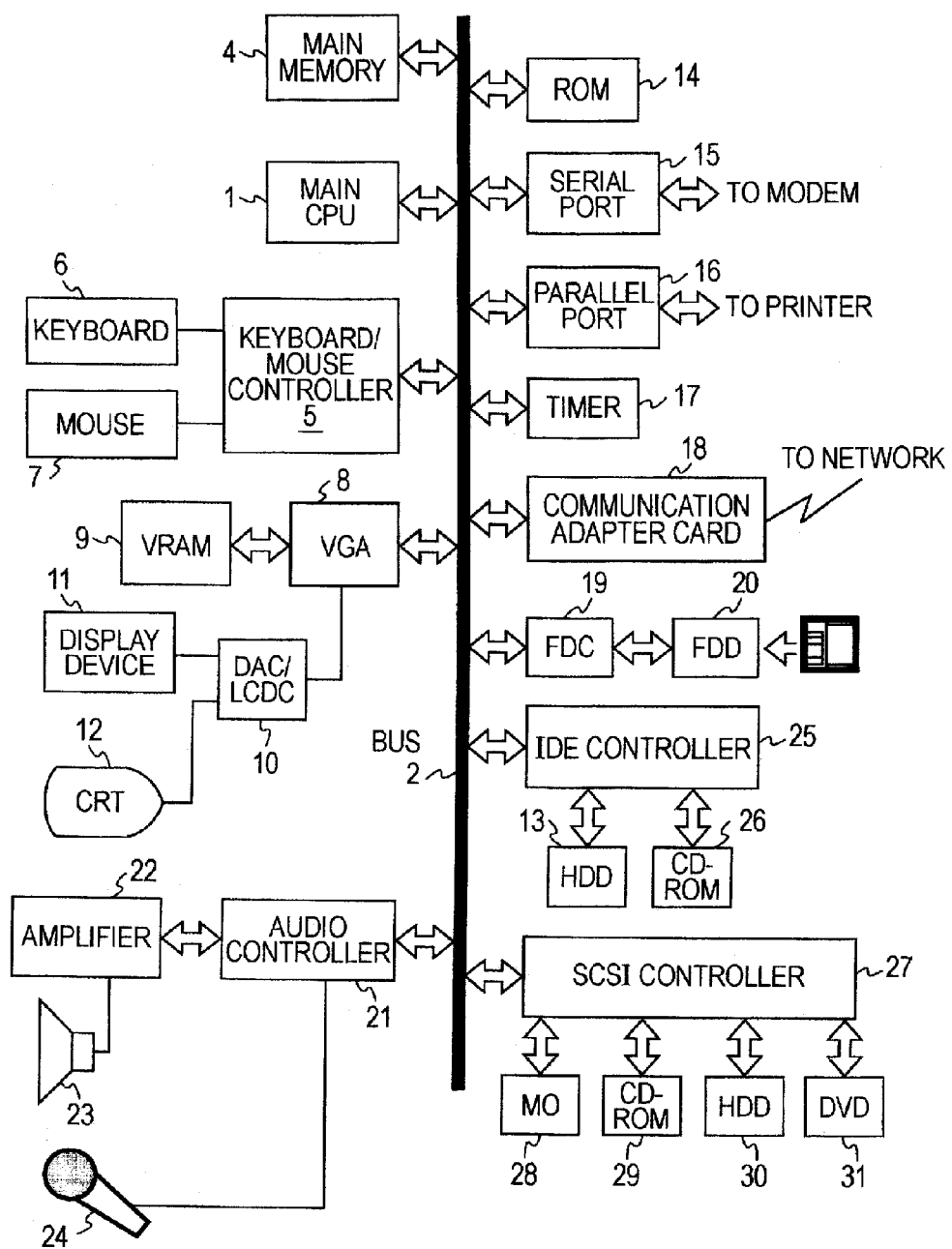
FIG. 8 illustrates an exemplary hardware configuration of an information processing apparatus suitable for realizing the supporting apparatus of the embodiment.

FIG. 8 illustrates an exemplary hardware configuration of an information processing apparatus suitable for realizing the supporting apparatus 110 of the present embodiment. The information processing apparatus includes the CPU 1 and main memory 4 connected to a bus 2. Hard disk devices 13 and 30 and removable storage devices (i.e., external storage systems into and from which a storage medium can be inserted and removed), such as compact disk read-only memory (CD-ROM) devices 26 and 29, flexible disk device 20, magneto-optical disk (MO) device 28, and digital versatile disk (DVD) device 31, are connected to the bus 2 via a floppy disk controller 19, integrated drive electronics (IDE) controller 25, small computer system interface (SCSI) controller 27, and the like.

A storage medium, such as a flexible disk, MO, CD-ROM, or DVD-ROM is inserted into its corresponding removable storage device. Computer program code that provides instructions to the CPU and the like in cooperation with an operating system to implement the present invention can be stored in such a storage medium, hard disk devices 13 and 30, or ROM 14. The computer program is executed by being loaded in the main memory 4. The computer program may be compressed or divided into segments so as to be stored in a plurality of media.

The information processing apparatus receives inputs from input devices, such as a keyboard 6 and a mouse 7, via a keyboard/mouse controller 5. The information processing apparatus is connected, via a digital-to-analog converter/liquid crystal display controller (DAC/LCDC) 10, to a display device 11 for presenting visual data to the user.

The information processing apparatus is connected to a network via a network adapter 18 (e.g., Ethernet (registered trademark) card or token ring card) and communicates with other computers. While not shown, the information processing apparatus can also be connected to a printer via a parallel port or connected to a modem via a serial port.

From the above description, it can be easily understood that the supporting apparatus 110 of the present embodiment can be realized by an information processing apparatus, such as a typical personal computer, workstation, or mainframe or by a combination of them. These examples are given for illustrative purposes only, and not all of them are essential components of the present invention.

The functions of hardware components of the information processing apparatus used in the present embodiment may be distributed among a plurality of machines that operate in combination. It will be understood that a variety of such modifications can be easily conceived by those skilled in the art and are within the idea of the present invention.

The supporting apparatus 110 of the present embodiment includes an operating system that supports a graphical user interface (GUI) multiwindow environment, such as a Windows (registered trademark) operating system provided by Microsoft Corporation, MacOS (registered trademark) provided by Apple Computer Incorporated, or a UNIX (registered trademark) system with X Window System (e.g., AIX (registered trademark) provided by International Business Machines Corporation).

Thus, it can be understood that the use of the supporting apparatus 110 of the present embodiment is not limited to use in specific multiwindow operating system environment.

The present invention can be implemented by hardware, software, or a combination of the two. Typical exemplary implementation achieved by the combination of hardware and software is implementation in a data processing system having a predetermined program. In this case, the predetermined program is loaded into and executed by the data processing system, thereby having the data processing system execute processing according to the present invention. This program contains a group of instructions that can be expressed by any language, code, or notation. Such a group of instructions enables the data processing system to perform specific functions directly or after (1) being converted into another language, code, or notation and/or (2) being copied to another medium.

It will be understood that the scope of the present invention not only includes such a program itself, but also includes a medium in which the program is stored. The program for performing the functions of the present invention can be stored in any computer-readable recording medium, including a flexible disk, MO, CD-ROM, DVD, hard disk device, ROM, magnetic random-access memory (MRAM), or RAM. For storage in a recording medium, this program can be downloaded from another data processing system connected via a communication line, or can be copied from another recording medium. Also, this program can be compressed or divided into a plurality of segments, and stored in a single or a plurality of recording media. It should be noted that it is also possible to provide, in a variety of forms, a program product for implementing the present invention.

It will be obvious to those skilled the art that various modifications and improvements can be made to the embodiments described above. It will be understood that such modified or improved embodiments are also within the technical scope of the present invention.

As an embodiment of the present invention, the speech interface design for the in-car air conditioner has been described for illustrative purposes. However, it should be noted that the present invention is applicable to speech interface design for any system that accepts a plurality of types of speech control. Examples of such a system include in-car equipment (other than the air conditioner described above), information appliance, speech-based call distribution system for call centers, speech-input information retrieval system, mobile phone, and browser that supports speech recognition.

In the above-described embodiment of the present invention, it has been described that a graph of the 12 speech control options for the in-car air conditioner is generated and analyzed by a consultant outside the company engaged in production and distribution of in-car air conditioners. However, such analysis may be made by a member of the company or by a design engineer of the in-car air conditioner. In other words, it should be noted that there is no restriction on who may implement the present invention.

What is claimed is:

1. A method for creating a speech interface of a system with a computer, the method comprising:
   accessing, with the computer, a database that includes speech samples associated with any of a plurality of speech controls to the system;
   calculating a similarity indication between a first set of speech samples associated with a first attribute and a second set of speech samples associated with a second attribute;
   displaying the similarity indication between the first set and the second set;
   receiving analytical results of the displayed similarity indication and generating an electronic report of the analytical results;
   generating a language model regarding the first set based upon the speech samples included in the first set; and
   calculating a perplexity regarding the first set using the language model regarding the first set;
   wherein displaying the similarity indication includes displaying a graph where points corresponding to each of the plurality of speech controls are plotted so as to express the similarity indication and a circle is drawn, wherein the circle has one of the points as a center and indicates the perplexity for the speech control corresponding to the one of the points.

2. The method according to claim 1, wherein preparing the electronic report includes a step of including an image of the graph in the electronic report.

3. A first system for creating a speech interface of a second system with a computer, the first system comprising at least one host computer configured to create a speech interface of the second system, the at least one host computer programmed to:
   access a database that includes speech samples associated with any of a plurality of speech controls to the second system;
   calculate a similarity indication between a first set of speech samples associated with a first attribute and a second set of speech samples associated with a second attribute;
   display the similarity indication between the first set and the second set;
   receive analytical results of the displayed similarity indication and generate an electronic report of the analytical results;
   generate a language model regarding the first set based upon the speech samples included in the first set; and
   calculate a perplexity regarding the first set using the language model regarding the first set;
   wherein displaying the similarity indication includes displaying a graph where points corresponding to each of the plurality of speech controls are plotted so as to express the similarity indication and a circle is drawn, wherein the circle has one of the points as a center and indicates the perplexity for the speech control corresponding to the one of the points.

4. The first system according to claim 3, wherein preparing the electronic report includes preparing an image of the graph in the electronic report.

5. At least one computer readable medium storing program code that, when executed by at least one processor, performs a method for creating a speech interface, the method comprising:
   accessing, with a computer, a database that includes speech samples associated with any of a plurality of speech controls to a system;
   calculating a similarity indication between a first set of speech samples associated with a first attribute and a second set of speech samples associated with a second attribute;
   displaying the similarity indication between the first set and the second set;
   receiving analytical results of the displayed similarity indication and generating an electronic report of the analytical results;
   generating a language model regarding the first set based upon the speech samples included in the first set; and
   calculating a perplexity regarding the first set using the language model regarding the first set;
   wherein displaying the similarity indication includes displaying a graph where points corresponding to each of the plurality of speech controls are plotted so as to express the similarity indication and a circle is drawn, wherein the circle has one of the points as a center and indicates the perplexity for the speech control corresponding to the one of the points.

6. The at least one computer readable medium according to claim 5, wherein the step of preparing the electronic report includes preparing an image of the graph in the electronic report.

* * * * *